United States Patent [19]

Sakamoto et al.

[11] Patent Number: 5,034,672
[45] Date of Patent: Jul. 23, 1991

[54] REFERENCE-POINT RETURN METHOD

[75] Inventors: Keiji Sakamoto, Tokyo; Shunsuke Matsubara; Kaname Matsumoto, both of Yamanashi, all of Japan

[73] Assignee: Fanuc Ltd., Japan

[21] Appl. No.: 427,125

[22] PCT Filed: Feb. 15, 1989

[86] PCT No.: PCT/JP89/00150

§ 371 Date: Oct. 18, 1989

§ 102(e) Date: Oct. 18, 1989

[87] PCT Pub. No.: WO89/08287

PCT Pub. Date: Sep. 8, 1989

[30] Foreign Application Priority Data

Feb. 24, 1988 [JP] Japan .................................. 63-041106

[51] Int. Cl.$^5$ ............................................. G05B 19/18
[52] U.S. Cl. ...................... 318/569; 318/571; 318/572; 318/573; 364/474.34
[58] Field of Search ..................... 318/560-640, 318/636, 661, 626; 364/474

[56] References Cited

U.S. PATENT DOCUMENTS

| 4,481,588 | 11/1984 | Komiya | 318/626 X |
| 4,513,234 | 4/1985 | Nozawa et al. | 318/594 |
| 4,575,666 | 3/1986 | Nakashima et al. | 318/661 |
| 4,647,827 | 3/1987 | Toyoda et al. | 318/625 X |
| 4,680,520 | 7/1987 | Toyoda et al. | 318/594 |
| 4,744,022 | 5/1988 | Kumar et al. | 318/626 X |
| 4,782,275 | 11/1988 | Sakamoto et al. | 318/571 X |
| 4,827,203 | 5/1989 | Sakano | 318/601 X |
| 4,847,777 | 7/1989 | Konno | 318/592 X |

Primary Examiner—Paul Ip
Attorney, Agent, or Firm—Staas & Halsey

[57] ABSTRACT

A reference-point return method for a numerical control system. When a return is made to a reference point, a numerical control unit (21) reads an absolute position of a motor (23) within one revolution thereof from an absolute position detector (24), obtains a distance B from a predetermined motor point (a grid point) to the absolute position that has been read, and initially sets the distance B as a command position $REF_n$ from the grid point. Thereafter, the numerical control unit (21) outputs a move command value $\Delta R_n$ to a digital servo-circuit (22) every predetermined time $\Delta T$, updates a commanded position $REF_n$ in accordance with the equation $$REF_n + \Delta R_n \rightarrow REF_n$$

obtains $REF_n$ after a deceleration limit switch (25) is depressed, and outputs $(N - REF_n)$ to the digital servo-circuit (22) as a final commanded traveling distance $\Delta R_n$ to return the movable element to a reference-point position set at a predetermined grid point.

4 Claims, 5 Drawing Sheets

FIG. 4 *PRIOR ART*

REFERENCE-POINT RETURN METHOD

BACKGROUND OF THE INVENTION

1. Field of the Invention

This invention relates to a reference-point return method and, more particularly, to a reference-point return method well suited for use in effecting return to a reference point in a numerically controlled machine tool employing a digital servo-circuit, which digitally generates a velocity command to move a movable element, and an absolute position detector.

2. Description of the Related Art

In a numerically controlled machine tool, it is necessary to return a movable element to a predetermined reference point before the start of numerical control, whereby coincidence can be achieved between machine position and the present position internally of a numerical control unit.

FIG. 4 is a block diagram of part of an apparatus for practicing a reference-point return method according to the prior art, and FIG. 5 is the associated time chart.

If a move command is given as NC data in a case where a reference-point return command ZRN is "0", a numerical control unit 11 computes a minute traveling distance, at a predetermined time interval, to be traversed along each axis during the time interval, and applies this minute traveling distance to a pulse distributor 12 for each axis at the abovementioned time interval until a destination is reached. Based on the minute traveling distance inputted thereto, the pulse distributor 12 performs a pulse distribution calculation to generate command pulses Pc. An error counter 13 constituted by a reversible counter counts the command pulses $P_c$, and a DA converter (not shown) applies a voltage proportional to the count of the error counter 13 to a velocity controller 14 as a velocity command, thereby rotating a servomotor 15 to transport a movable element such as a tool or table, not shown.

A rotary encoder 16 is rotated by the rotation of the servomotor. The rotary encoder 16 is adapted to generate a single feedback pulse $P_F$ whenever it rotates by a predetermined amount and to generate a one-revolution signal whenever it makes one full revolution. Accordingly, the amount of rotation of the servomotor is detected by the rotary encoder 16 and is input to the error counter 13 as the feedback pulses $P_F$, thereby diminishing the count of the error counter 13 in the zero direction. When a steady state prevails, the data (error) in the error counter 13 becomes substantially constant and the servomotor 15 rotates at a substantially constant velocity. When the command pulses stop arriving and the number of feedback pulses $P_F$ generated becomes equal to the number of command pulses, the data in the error counter 13 becomes zero and the servomotor 15 stops rotating.

When the reference-point return command ZRN is "1", on the other hand, the numerical control unit 11 calculates a minute traveling distance every predetermined time period along each axis for transporting the movable element at a rapid-traverse velocity, and inputs these distances to the pulse distributor 12, whereby the movable element is transported just as described above. It should be noted that the actual velocity $V_a$ at this time gradually rises to the rapid-traverse velocity $V_R$, as shown in FIG. 5.

A gate 17 is open at the start of reference-point return. Therefore, the command pulses $P_C$ and the feedback pulses $P_F$ are input to a reference counter 18, just as to the error counter 13. The reference counter 18 is constituted by a reversible counter and has a capacity N (equivalent to the number of feedback pulses PF generated during one revolution of the rotary encoder). The contents REF of the reference counter 18 agrees with the contents (error) E of the error counter 13.

When the actual velocity $V_a$ exceeds a predetermined first reference velocity $VR_1$, the numerical control unit 11 generates a control signal $D0_1$. After the control signal $D0_1$ is generated, a gate control circuit 19 closes the gate 17 in response to the generation of the first one-revolution signal RTS. Thereafter, the reference counter 18 counts up only command pulses $P_C$, so that the content REF thereof varies as shown in FIG. 5. A servo delay (=E) at time T0 is set in the reference counter 18, after which the command pulses PC are counted. Therefore, the content REF can be regarded as a command position reset whenever the capacity N is reached. The actual machine position is indicated by the one-dot chain line in FIG. 5.

When the movable element travels and depresses a deceleration limit switch provided in the vicinity of the reference point, a deceleration signal DEC assumes a low level (="0"). As a result, the numerical control unit 11 executes processing in such a manner that the traveling velocity of the movable element is slowed down to a second reference velocity $VR_2$ (at time T1), after which the movable element is moved at the velocity $VR_2$.

As the movable element travels further at the low velocity and the deceleration limit switch is restored (time T2), the numerical control unit 11 generates a gate signal $D0_2$.

When a predetermined command pulse $P_C$ is subsequently generated, the movable element travels further and the counted value REF in the reference counter 18 becomes zero. As a result, the signal ZR becomes "1" (T3), whereupon the gate 20 closes and the command pulses $P_C$ are no longer delivered.

Thereafter, the count in error counter 13 gradually diminishes, as a result of which the rotational velocity of the servomotor 15 decreases. The count E in error counter 13 finally comes to rest at zero when the one-revolution signal RTS is generated.

In accordance with this conventional reference-point return method, the return to the reference point can be performed accurately independently of the amount of delay. In addition, if a one-revolution position is referred to as a grid point, the movable element can be reference-point returned to the first grid point after the deceleration limit switch is restored. Moreover, by presetting a numerical value M in the reference counter 18, a position displayed M pulses from the grid position can be made the reference point-return position. Thus, the conventional method is a useful one.

There has been a recent trend toward digital control of servomotors. With such a digital servo, a traveling distance $\Delta R_n$ to be traveled along each axis every predetermined time $\Delta T$ (e.g., 2 msec) is calculated by a numerical control unit, a value obtained by multiplying the traveling distance $\Delta R_n$ by a predetermined gain is inputted to a digital servo-circuit every predetermined time $\Delta T$, and the digital servo-circuit performs a calculation in accordance with the following equation every $\Delta T$:

$$E + \Delta R_n - \Delta P_n \rightarrow E$$

(where $\Delta P_n$ is the actual traveling velocity every $\Delta T$ and E a cumulative error whose initial value is zero) and executes pulse-width modulation in accordance with the size of the error E, thereby controlling the servomotor.

In other words, in the case of a digital servo, the pulse distributor 12 which generates the serial pulses is not provided, and the error counter is substituted by a RAM in the numerical control unit 11.

A problem which results is that the conventional reference-point return method cannot be applied to reference-point return of a numerically controlled machine employing such a digital servo.

Accordingly, the applicant has proposed, as Japanese Patent Application No. 61-034880 (filed on Feb. 19, 1987 and entitled "Reference-Point Return Method", for which the corresponding U.S. Patent is U.S. Pat. No. 4,782,275), a reference-point return method applicable to reference-point return in a machine tool employing a digital servo.

In this proposed reference-point return method, an incremental pulse generated whenever a motor rotates through a predetermined angle and a one-revolution signal generated whenever the motor makes one revolution are essential requisites.

Recently, machine tools have come to employ an absolute position detector composed of a pulse coder which outputs absolute position within one revolution of a motor whenever the motor rotates through a predetermined angle, and a counter for counting the number of revolutions of the motor in dependence upon the direction of rotation using the absolute position within one revolution generated by the pulse coder, and storing the absolute position of the machine based on the number of motor revolutions and the absolute position within one revolution. The counter continues storing the absolute position of the machine even when power is cut off. The capacity of the counter is a number of pulses N generated by the pulse coder per one revolution of the motor.

Though such an absolute position detector outputs absolute position within one revolution of the motor, it is not adapted to produce the incremental pulses and the one-revolution signal.

As a consequence, a problem which arises with the proposed reference-point return method is that it cannot be applied to reference-point return in a machine tool equipped with the absolute position detector.

Accordingly, an object of the present invention is to provide a reference-point return method applicable to a numerically controlled machine tool which employs a digital servo-circuit and an absolute position detector.

SUMMARY OF THE INVENTION

When a return is made to a reference point, a processor in a numerical control unit reads an absolute position of a motor within one revolution thereof from an absolute position detector at any point in time, obtains a distance B from a predetermined motor point (a grid point) to the absolute position that has been read, and initially sets the distance B as a command position $REF_n$ from the grid point. There are N absolute positions of the motor within one revolution thereof.

Thereafter, the processor outputs a move command value $\Delta R_n$ to a digital servo-circuit every predetermined time $\Delta T$, updates a commanded position $REF_n$ in accordance with the equation $$REF_n + \Delta R_n \rightarrow REF_n$$

where $$REF_n + \Delta R_n - N \rightarrow REF_n$$

holds in case of $(REF_n + \Delta R_n) \geq N$, obtains $REF_n$ at an initial time following restoration after a deceleration limit switch is depressed, and outputs $(N - REF_n)$ to the digital servo-circuit as a final commanded traveling distance $\Delta R_n$ to return the movable element to a reference-point position set at a predetermined grid point.

DESCRIPTION OF THE PREFERRED EMBODIMENT

Figure 1:
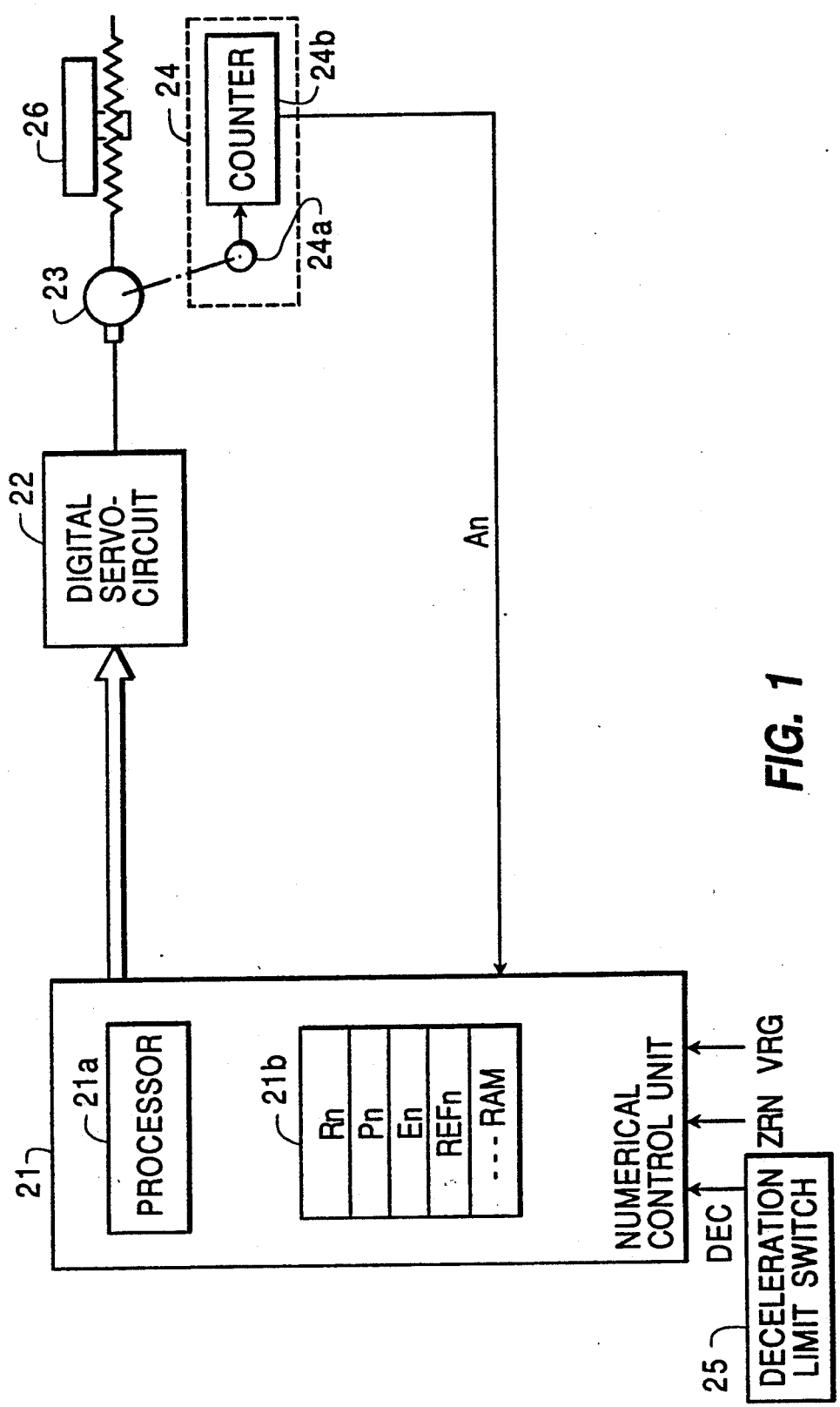
FIG. 1 is a block diagram showing the principal portions of a numerical control system for describing the reference-point return method of the present invention.

FIG. 1 is a block diagram showing the principal portions of a numerical control system for describing the reference-point return method of the present invention.

Numeral 21 denotes a computerized numerical control unit for transporting a movable element such as a tool or table by generating a move command value $\Delta R_n$ at every predetermined time $\Delta T$. Numeral 21a denotes a processor, and 21b denotes a RAM. Numeral 22 designates a digital servo-circuit and 23 a servomotor. Shown at numeral 24 is an absolute position detector composed of a pulse coder 24a which outputs absolute position within one revolution of the servomotor 23 whenever the motor rotates through a predetermined angle, and a counter 24b for counting the number of revolutions of the motor in dependence upon the direction of rotation using the absolute position within one revolution generated by the pulse coder, and storing and outputting the absolute position $A_n$ of the machine based on the number of motor revolutions and the absolute position within one revolution. The counter 24b continues storing the absolute position $A_n$ of the machine even when power is cut off. By way of example, it will be assumed that there exist a total of N absolute positions, from $0000_H$ (H indicates a hexadecimal number) to $FFFF_H$, within one revolution of the motor, and that a point indicated by $0000_H$ is a grid point.

Numeral 25 denotes a deceleration limit switch provided in the vicinity of a reference point, and numeral 26 designates the movable element of a machine tool.

Figure 2:
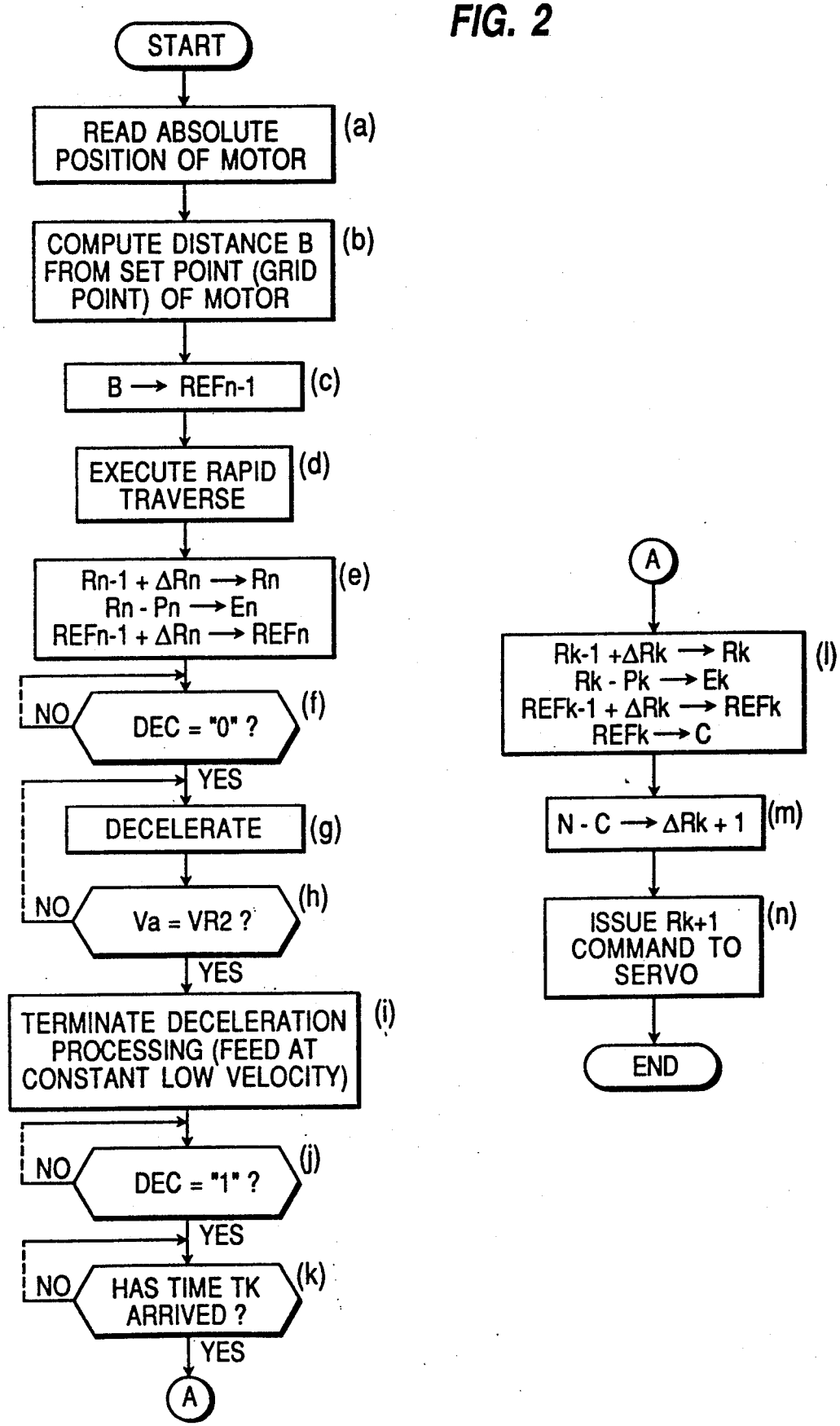
FIG. 2 is a flowchart of processing according to the present invention.
Figure 3:
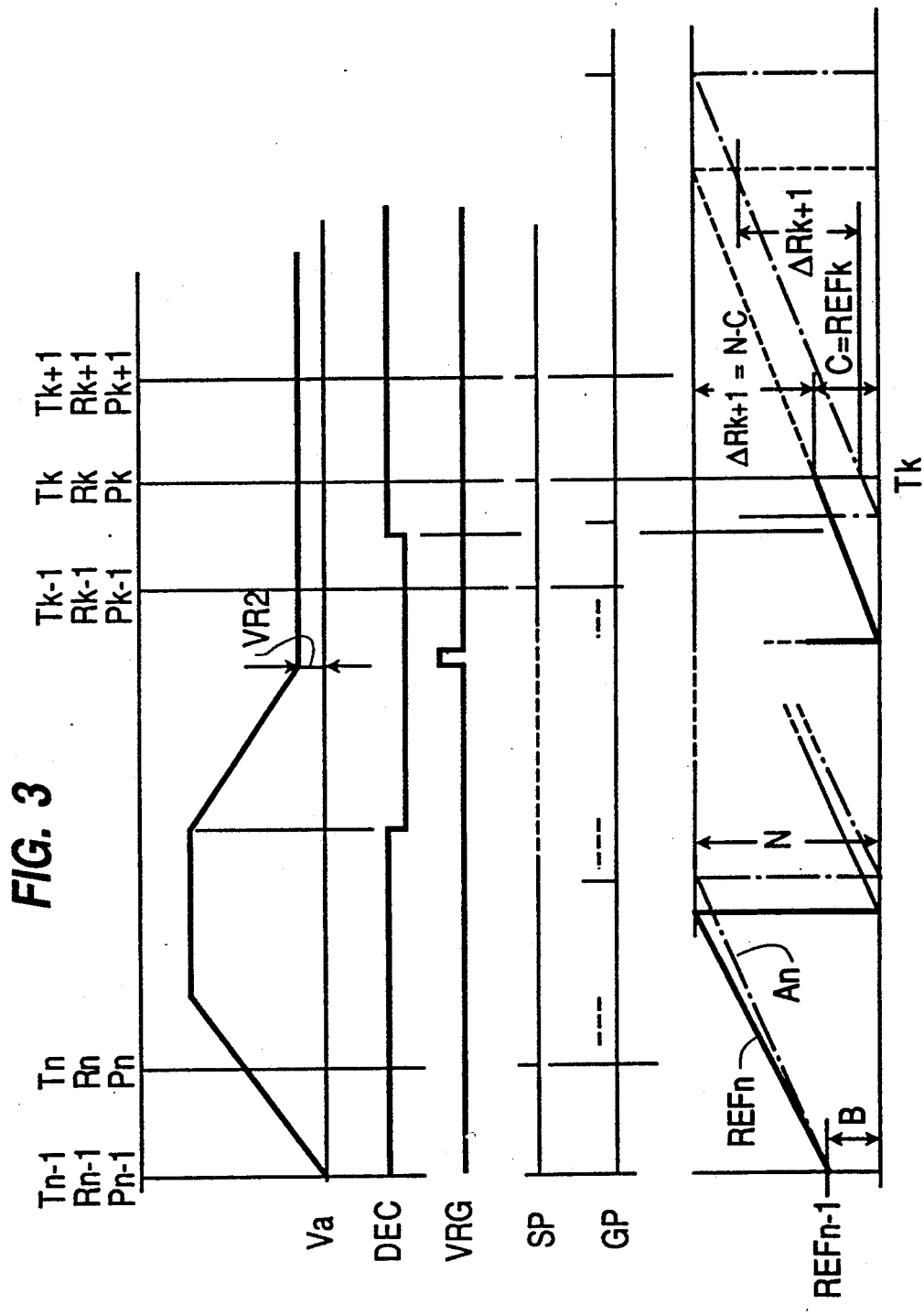
FIG. 3 is a time chart according to the invention.
Figure 4:
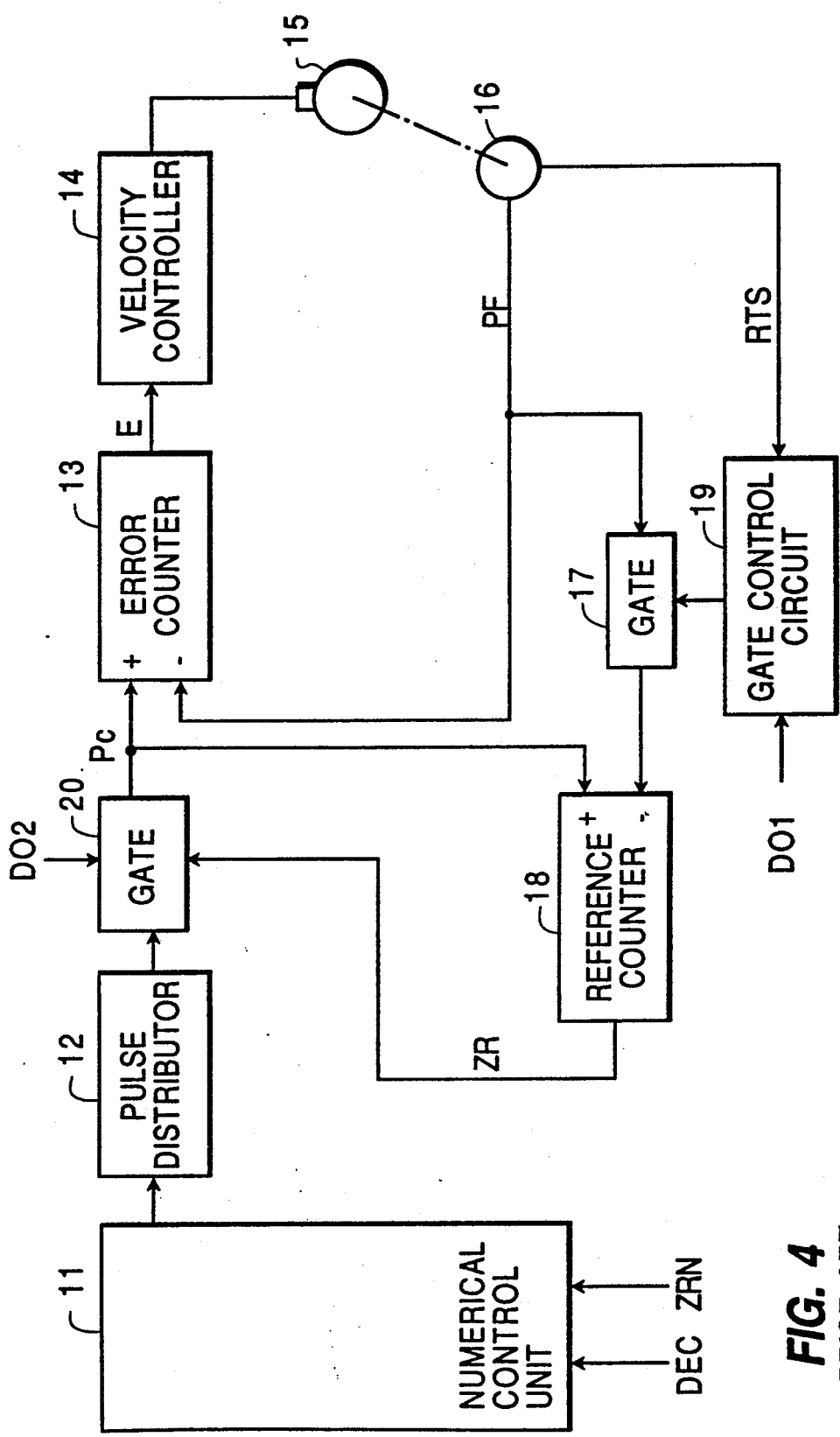
FIG. 4 is a block diagram of a conventional apparatus.
Figure 5:
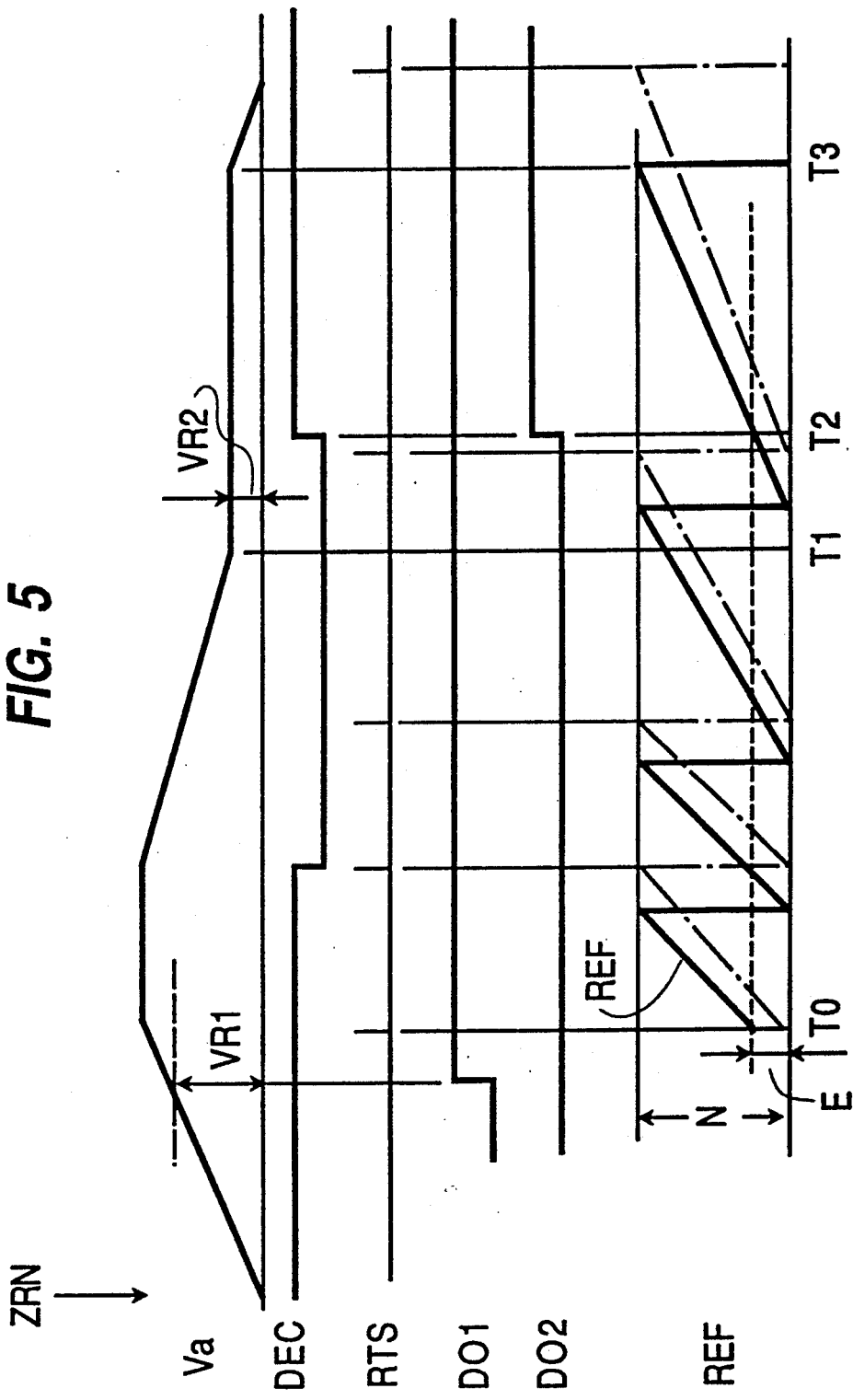
FIG. 5 is a time chart associated with the apparatus of FIG. 4.

FIG. 2 is a flowchart of processing for the reference-point return method according to the present invention, and FIG. 3 is a time chart. Reference-point return processing according to the invention will now be described with reference to FIGS. 1 through 3. It is assumed that a sampling pulse SP is generated and that the processor performs predetermined processing every $\Delta T$ (e.g., 2 msec). Further, let a commanded position at each time $T_n$ (n=1, 2 . . . ) be expressed by $R_n$, the present machine position by $P_n$, and an error by $E_n$. Also, let a commanded position from a grid point every revolution be expressed by $REF_n$. The steps illustrated in FIG. 2 are described below.

(a) When the power supply of the numerical control system is turned on and the reference-point return mode is established, the processor 21a goes to the absolute position detector 24 to read, at a predetermined time every $\Delta T$, the absolute position $P_A$ ($P_A$ is a hexadecimal value) at which the motor is presently situated.

(b) Next, the processor 21a computes the distance B from the grid point to the absolute position at which the motor is situated. If the grid point is $0000_H$, for example, then distance $B = P_A$. If $P_A = 1FFF_H$ holds, then the distance B will be $1FFF_H$.

(c) When the distance B has been obtained, the processor 21a initially sets B as a commanded position $REF_{n-1}$ from the grid point.

(d) Thereafter, the processor 21a computes a minute traveling distance $\Delta R_n$ every predetermined time $\Delta T$ (2 msec) along each axis to transport the movable element 26 at the rapid-traverse velocity, multiplies the traveling distance by a predetermined gain and applies the result to the digital servo-circuit 22 to rotate the servomotor 23, thereby transporting the movable element 26.

(e) In parallel with the rapid-traverse processing of step (d), the processor 21a performs the following arithmetic operations every $\Delta T$ (2 msec):

$$R_{n-1} + \Delta R_n \rightarrow R_n \quad (1)$$

$$R_n - P_n \rightarrow E_n \quad (2)$$

$$REF_{n-1} + \Delta R_n \rightarrow REF_n \quad (3)$$

to obtain the commanded position $R_n$, error $E_n$ and $REF_n$ and store these in the RAM 21b. It should be noted that $REF_n$ is the commanded position (the commanded position per revolution) of the motor from the grid point. In a case where ($REF_n + \Delta R_n$) is greater than N, the command position $REF_n$ per revolution is obtained in accordance with the equation $$REF_n + \Delta R_n - N \rightarrow REF_n \quad (3)'$$

instead of using Eq. (3). As a result, the commanded position $REF_n$ every revolution has the commanded traveling distance $\Delta R_n$ added to it every $\Delta T$ and changes as shown in FIG. 3. The absolute position $A_n$ read from the absolute position detector 24, namely the present machine position from the grid point, is indicated by the one-dot chain line, and the difference between $REF_n$ and $A_n$ corresponds to a delay $E_n$.

In Eq. (2), $P_n$ represents the present machine position. If $P_{n-1}$ represents the position at a time $\Delta T$ earlier and $A_{n-1}$ and represent the absolute positions at earlier and $A_{n-1}$ and $A_n$ represent the absolute positions at the time $\Delta T$ earlier and at the present time, respectively, then $P_n$ is computed as follows:

$$P_{n-1} + (A_n - A_{n-1}) \rightarrow P_n \quad (4)$$

(f) By virtue of the foregoing control, the actual velocity $V_a$ gradually rises and attains a fixed rapid-traverse velocity, so that the movable element 26 is transported in the direction of the reference point at the rapid-traverse velocity. Thereafter, in parallel with the rapid-traverse control of steps (d) and (e), processor 21a checks to see whether the deceleration signal DEC has become "0" as a result of the deceleration limit switch 25 being depressed by the movable element 26.

(g) When the movable element 26 travels in the direction of the reference point and the deceleration limit switch 25 provided in the vicinity of the reference point is depressed by the movable element, the deceleration signal DEC becomes "0". When this occurs, the processor 21a performs deceleration processing. That is, the processor successively decreases the command amount of movement $\Delta R_n$ every $\Delta T$ and executes the processing of step (e).

(h) The processor 21a subsequently checks whether the actual velocity $V_a$ has attained a second reference velocity $VR_2$.

(i) If $V_a = VR_2$ holds, signal VRG will become "1" and, hence, deceleration processing is terminated. As a result, the movable element 26 is subsequently moved in the direction of the reference point at the abovementioned velocity.

(j) The processor 21a then checks whether the deceleration signal DEC has attained the value "1".

(k) When the movable element 26 travels further in the direction of the reference point, the deceleration limit switch 25 being depressed by the movable element 26 is restored, so that the deceleration signal DEC changes from "0" to "1".

When the condition DEC = "1" is attained, it is determined whether an initial time $T_k$ every $\Delta T$ has arrived.

(l) If time $T_k$ has arrived, the processor 21a executes Eqs. (1)~(2) and Eq. (3) or (3)' (the operation $n \rightarrow k$ is performed in each equation) to calculate a command position $R_k$, error $E_k$ and commanded position $REF_k$ every revolution.

Further, the operation $REF_k \rightarrow C$ is preformed (see FIG. 3).

(m) Next, in accordance with the following equation, the processor 21a calculates an amount of travel $\Delta R_{k+1}$ necessary to make the commanded position the grid position of the motor, and updates the commanded position in accordance with Eq. (1):

$$N - C \rightarrow \Delta R_{k+1} \quad (7)$$

(n) Thereafter, $R_{k+1}$ is outputted to the digital servo-circuit 22 as the final commanded amount of travel. As a result, the movable element 26 is moved by the amount of delay $\Delta R_{k+1}$ from time $T_k$ and is stopped upon arriving at the one-revolution position. The reference-point return operation is then ended.

Thus, in accordance with the present invention, a reference-point return operation can be performed by software processing within a computerized numerical control unit. Consequently, the invention is well suited for application to reference-point return in a numerically controlled machine tool employing a digital servo-circuit.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

We claim:

1. A method for returning a movable element of a machine tool to a reference point using a motor having a grid point and driven by move commands, said method comprising the steps of:
   (a) receiving an absolute position of the motor;
   (b) calculating an initial motor position based on the absolute position and the grid point;
   (c) initially setting a commanded position based on a distance from the grid point to the initial motor position;
   (d) executing rapid-traverse processing using the move commands to gradually increase an actual velocity of the movable element towards the reference point to a rapid-traverse velocity;
   (e) updating the commanded position from the grid point to produce an updated commanded position based on a travelling distance occurring every predetermined time period;
   (f) determining if a deceleration signal requests deceleration of the movable element;
   (g) executing deceleration processing to gradually decrease the actual velocity of the movable element towards the reference point to a predetermined low velocity when said determining in step (f) determines that deceleration is requested by the deceleration signal;
   (h) determining if the deceleration signal no longer requests deceleration of the movable element;
   (i) updating the commanded position at a next time period of the predetermined time period after said determining in step (h) determines that deceleration is no longer requested;
   (j) calculating a final move command value based on the commanded position obtained in step (i); and
   (k) outputting the final move command and the move commands to the motor.

2. A method according to claim 1, wherein the absolute position received in position (a) is one of N positions of an absolute position detector.

3. A method according to claim 2,
   wherein steps (b)-(i) are performed by a computerized numerical control unit, and
   wherein the move commands are digital signals.

4. A method according to claim 3, wherein said updating in step (e) is performed every predetermined time period according to the following equation:

$$REF_n + \Delta R_n \rightarrow REF_{n+1}$$

where $REF_n$ is the commanded position, $\Delta R_n$ is the move command, and $REF_{n+1}$ is the commanded position after being updated.

* * * * *